US009964293B2

(12) United States Patent
Devlin

(10) Patent No.: US 9,964,293 B2
(45) Date of Patent: May 8, 2018

(54) MOTORIZED LIGHT ASSEMBLY

(71) Applicant: Loto Lighting LLC, Somerville, MA (US)

(72) Inventor: Thomas E. Devlin, Winchester, MA (US)

(73) Assignee: Formalighting LLC, Alpharetta, GA (US)

( * ) Notice: Subject to any disclaimer, the term of this patent is extended or adjusted under 35 U.S.C. 154(b) by 343 days.

(21) Appl. No.: 14/669,251

(22) Filed: Mar. 26, 2015

(65) Prior Publication Data

US 2015/0276190 A1 Oct. 1, 2015

Related U.S. Application Data

(60) Provisional application No. 61/971,119, filed on Mar. 27, 2014.

(51) Int. Cl.

| | |
|---|---|
| ***B60Q 1/06*** | (2006.01) |
| ***F21V 21/15*** | (2006.01) |
| ***F21V 14/02*** | (2006.01) |
| ***F21S 8/02*** | (2006.01) |
| ***F21V 21/30*** | (2006.01) |
| *F21W 131/406* | (2006.01) |
| *F21V 23/00* | (2015.01) |
| *F21Y 115/10* | (2016.01) |

(52) U.S. Cl.
CPC .............. *F21V 21/15* (2013.01); *F21S 8/026* (2013.01); *F21V 14/02* (2013.01); *F21V 21/30* (2013.01); *F21V 23/00* (2013.01); *F21W 2131/406* (2013.01); *F21Y 2115/10* (2016.08)

(58) Field of Classification Search
CPC .......... F21V 14/02; F21V 21/14; F21V 21/15; F21V 21/26; F21V 21/28; F21V 21/30
USPC .... 362/147–150, 239, 249.1, 269, 275, 285, 362/287, 366, 372, 418–419, 427–428, 362/470–472
See application file for complete search history.

(56) References Cited

U.S. PATENT DOCUMENTS 3,287,552 A 11/1966 Drandell
3,375,362 A 3/1968 Klippert
3,783,263 A 1/1974 Cruse
(Continued)

FOREIGN PATENT DOCUMENTS

DE 3807504 9/1989
EP 1582805 10/2005
(Continued)

*Primary Examiner* — Jason Moon Han
(74) *Attorney, Agent, or Firm* — Occhiuti & Rohlicek LLP

(57) ABSTRACT

A motorized assembly for mounting on a frame of a light fixture includes a central housing having a first exterior surface and a second exterior surface. The second exterior surface defining an aperture and the central housing including a first mounting device configured to mount on the frame to enable rotation of the central housing about a first axis of rotation. The central housing further includes an interior region between the first and second exterior surfaces with a first drive mechanism proximate the first exterior surface and engaged with the first mounting device to enable rotation of the central housing about the first axis of rotation when the central housing is engaged with the frame. There is also a second drive mechanism, disposed within the interior region of the central housing and proximate the second exterior surface, adapted for engagement with a second mounting device.

17 Claims, 7 Drawing Sheets

(56) References Cited

U.S. PATENT DOCUMENTS

| | | | |
|---|---|---|---|
| 4,112,486 | A | 9/1978 | Tovi |
| 4,392,187 | A | 7/1983 | Bornhorst |
| 8,408,760 | B2 | 4/2013 | Bornhorst et al. |
| 8,622,563 | B2 | 1/2014 | Manners |
| 2010/0149822 | A1 | 6/2010 | Cogliano |
| 2012/0147604 | A1 | 6/2012 | Farmer |
| 2013/0200818 | A1 | 8/2013 | Cercone |
| 2013/0215629 | A1 | 8/2013 | Bornhorst et al. |

FOREIGN PATENT DOCUMENTS

| | | |
|---|---|---|
| EP | 1657486 | 5/2006 |
| EP | 1353122 | 10/2011 |
| EP | 2623855 | 8/2013 |
| WO | 2010/037384 | 4/2010 |
| WO | 2012/135202 | 10/2012 |

MOTORIZED LIGHT ASSEMBLY

CROSS REFERENCE TO RELATED APPLICATION

This application claims priority to U.S. Provisional Application No. 61/971,119 filed on Mar. 27, 2014, the contents of which are hereby incorporated by reference in their entirety.

FIELD OF INVENTION

The present invention relates to a motorized light assembly, and more particularly to a compact light assembly with a remote controlled, motorized gimbal for allowing easy rotational adjustability.

BACKGROUND

Motorized remote controlled lighting is primarily used in stage settings. Typically a rotational motor is housed in a base unit for panning the light in full circle, and a second motor is housed in yolk to tilt the lamp between horizontal and vertical orientations.

In non-motorized recessed interior lighting for a ceiling, a two axis gimbal arrangement is often used when manual adjustability is required. Two orthogonal axes are arranged parallel to the ceiling, and movement is achieved with a turn of 180 degrees or less of each axis. This has disadvantages because the light beam can be obstructed by fixture components at more extreme angles from vertical, and adjustment is less intuitive than pan and tilt. However, it is perceived as more elegant, and the construction is simple, requiring only screws or rivets to create the rotational axes.

Attempts have been made to add remote control to recessed lighting in the past. These generally have used a pan and tilt arrangement, where a round stage is rotated via a motor actuating a large gear to achieve pan, and a second motor tilts the lamp. These have resulted in large purpose-built 'cans' that reside in the ceiling to hide all the motors and wiring to the motors.

When a motorized two-axis gimbal arrangement for a light fixture has been attempted, the motors had to be mounted remotely because the heat of the lamp could ruin motors, which results in a bulky and complex configuration.

SUMMARY

The invention is directed to a motorized assembly for mounting on a frame of a light fixture, including a central housing, having a first exterior surface and a second exterior surface, the second exterior surface defining an aperture in said central housing. The central housing includes a first mounting device configured to engage with and mount on the frame to enable rotation of the central housing about a first axis of rotation. The central housing further includes an interior region between the first and second exterior surfaces. There is a first drive mechanism, disposed within the interior region of the central housing and proximate the first exterior surface, engaged with the first mounting device to enable rotation of the central housing about the first axis of rotation when the central housing is engaged with the frame. There is also a second drive mechanism, disposed within the interior region of the central housing and proximate the second exterior surface, adapted for engagement with a second mounting device.

The invention includes a lamp assembly with the second mounting device which engages with the second drive mechanism to mount the lamp assembly within the aperture of the central housing and enable rotation of the lamp assembly about a second axis of rotation, which is transverse to the first axis of rotation. The central housing is in the shape of a ring and is configured to be disposed within a circular opening in the frame or the central housing is in the shape of a rectangle and is configured to be disposed within a rectangular opening in the frame. The first mounting device comprises two bearing surfaces on opposite sides of the second outer surface of the central housing and the second mounting device comprises two bearing surfaces on opposite sides of the lamp assembly, which respectively engage with the frame and the first surface of the central housing. The first and second mounting device are gimbals and the first axis of rotation and the second axis of rotation are co-planar and perpendicular.

The first and second drive mechanisms include a drive housing with a first convex shaped exterior wall through which the output drive shaft extends. Each of the first and second drive mechanisms further include and a second convex shaped exterior wall opposite the first convex shaped exterior wall and the first and second convex exterior walls converge at an end of a drive housing. The interior region of the housing is enclosed. There is further included communication and control electronics within the interior region of the housing which enable the first and second drive mechanisms to be remotely controlled.

The invention also provides that the two bearing surfaces of the first mounting device each include a pinion which engages with a gear on the frame and the second mounting device is a gimbal. The central housing is in the shape of a ring and is configured to be disposed within a circular opening in the frame; wherein the gear on the frame is circular and surrounds the central housing; and wherein the pinions are driven by the first drive mechanism to cause the central housing to rotate about the first axis. The first axis of rotation is perpendicular to the circular opening in the frame and the second axis of rotation is perpendicular to the first axis of rotation. The lamp assembly includes an LED lamp.

The invention is also directed to a motorized light fixture for mounting on a surface, comprising a frame configured to be mounted on the surface; and a motorized assembly mounted on the frame. The motorized assembly includes a central housing, having a first exterior surface and a second exterior surface, the second exterior surface defining an aperture in said central housing. The central housing also includes a first mounting device configured to engage with and mount on the frame to enable rotation of the central housing about a first axis of rotation and the central housing further includes an interior region between the first and second exterior surfaces. There is a lamp assembly including a second mounting device which engages with the second exterior surface of the central housing to mount the lamp assembly within the aperture of the central housing and enable rotation of the lamp assembly about a second axis of rotation, which is transverse to the first axis of rotation. There is a first drive mechanism disposed within the interior region of the central housing and engaged with the first mounting device to enable rotation of the central housing about the first axis of rotation and a second drive mechanism disposed within the interior region of the central housing and engaged with the second mounting device to enable rotation of the lamp assembly about the second axis of rotation. The motorized light fixture further includes a plurality of rotatable assemblies mounted on the frame.

The invention is further directed to a ring shaped motorized lamp fixture comprising a frame configured for mounting on a surface; the frame including a circular opening around which is disposed a circular gear. There is a ring shaped central housing disposed within the circular opening of the frame and having a first exterior surface and a second exterior surface. The second exterior surface defining an aperture in the central housing and the central housing including two bearing surfaces each has a pinion which engage with the gear. The central housing further including an interior region between the first and second exterior surfaces. There is a lamp assembly including a two bearing surfaces which engage with the second exterior surface of the central housing to mount the lamp assembly within the aperture of the central housing and enable rotation of the lamp assembly about a second axis of rotation, which is transverse to the first axis of rotation. There is also a first drive mechanism disposed within the interior region of the central housing and engaged with the pinions; wherein the pinions are driven by the first drive mechanism to cause the central housing to rotate about the first axis. There is further a second drive mechanism disposed within the interior region of the central housing and engaged with the two bearing surfaces to enable rotation of the lamp assembly about the second axis of rotation.

The invention also includes a drive mechanism for a motorized lamp fixture having a ring shaped housing, wherein the drive mechanism is adapted to be disposed within the ring shaped housing. The drive mechanism includes a first convex exterior wall through which an output drive shaft extends and a second exterior wall opposite the first convex shaped exterior wall. The first and second exterior walls converge at a first end of the drive housing and the first convex exterior wall is configured to engage and substantially mate with a concave wall within the ring shaped housing. The second exterior may also be convex shaped.

It is an object of this invention to provide a lighting assembly which can be added to existing recessed lighting fixtures via a motorized central stage, or gimbal ring, that can be attached in the same manner as the central stage of a simple two axis gimbal. All motors, wiring, and optionally, communications and control, would be housed within this central stage. In this way, no special consideration will be needed to use the gimbal ring in present recessed light fixture construction.

It is also an object of this invention to make this central stage as thin as possible, so that fixtures do not have to be unduly enlarged to add the motor control. With some exceptions, all lamps are circular, so it is a challenge to create a motor arrangement that would fit in a slim ring shape.

It is also an object of this invention to make this at low cost, so it is advantageous to use the same gear motor design for the outside and inside axis. This presents a challenge because the motor would have to fit within the curved wall in two opposite orientations. This was solved with careful gear arrangement, resulting in a wedge shaped gear motor housing.

It is also an object of this invention to accommodate other configurations. Shapes other than circular can be used for the central stage housing. Also, with all motors and preferably electronics housed inside the central stage, the entire fixture can be exposed in applications other than recessed lighting. This could include multiple lamp racks that are hung externally.

It is also an object of this invention to use the elegant self contained motorized ring shape for an application that requires pan and tilt instead of a gimbal movement. With little change, the ring can be configured with a pinion on the outward facing shaft that would turn on a ring-shaped rack inside a recessed fixture.

The ring can be attached to existing recessed lighting designs with little change by means of simple fasteners, such as rivets or screws.

Other features and advantages of the invention are apparent from the following description, and from the claims.

DETAILED DESCRIPTION

Figure 1A:
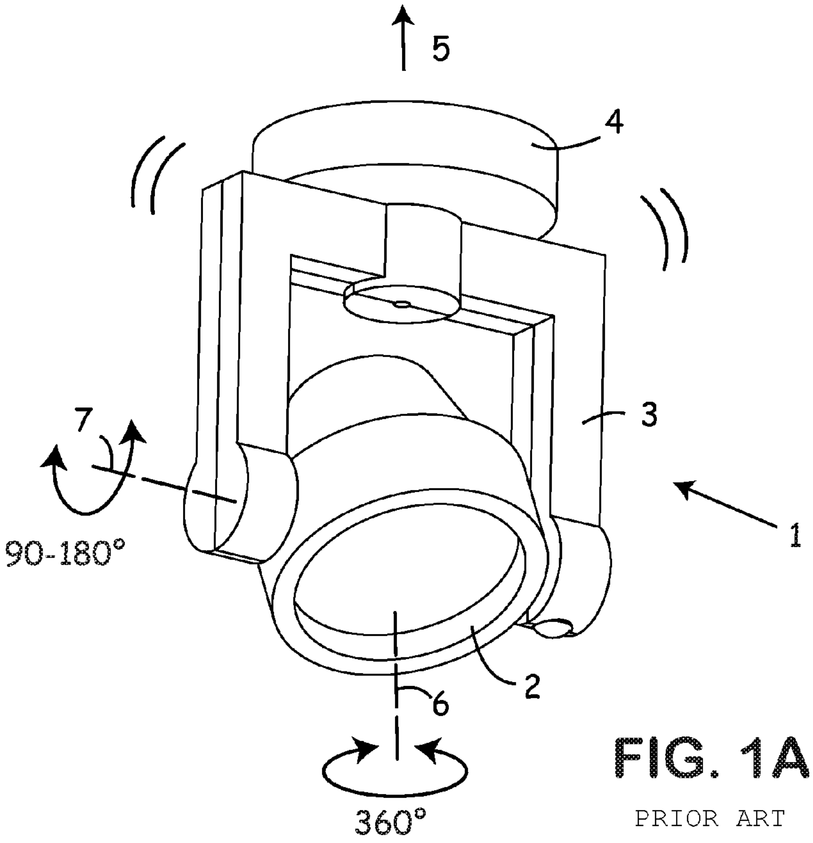
FIG. 1A PRIOR ART
FIG. 1*a* is a perspective view of a prior art light fixture with motorized pan and tilt movement using a yolk.

Referring to FIG. 1A, a typical prior art motorized lamp 1 will rotate the yolk shaped central stage 3 in a full circle by means of a base with motor 4 about axis 6 which is perpendicular to supporting plane 5. The lamp 2 is rotated by motors within yolk shaped stage 3 about axis 7, which is substantially parallel to supporting plane 5.

Figure 1B:
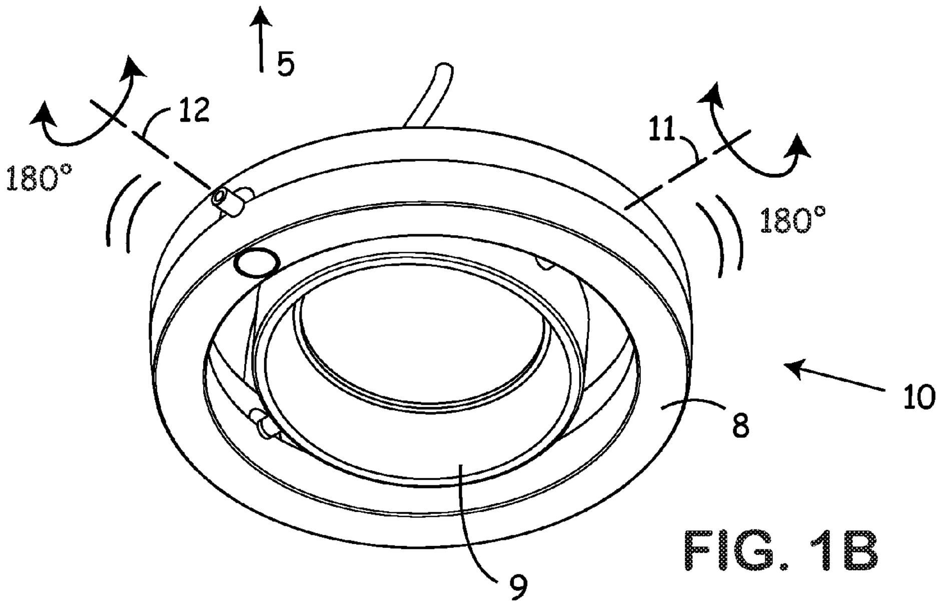
FIG. 1*b* is a perspective view of the two axis gimbal movement of a light fixture with motorized centralstage according to this invention.

Referring to FIG. 1B, there is shown a ring-shaped light fixture 10 (with supporting frame not shown) according to this invention using a motorized gimbal. The fixture 10 has a motorized central stage 8 that can rotate relative to external mounting, i.e. a frame, via a first axis 12 which is generally parallel to supporting plane 5, and also rotate lamp assembly 9 via a second axis 11 which is also parallel to support plane 5 and perpendicular to axis 12.

Figure 2:
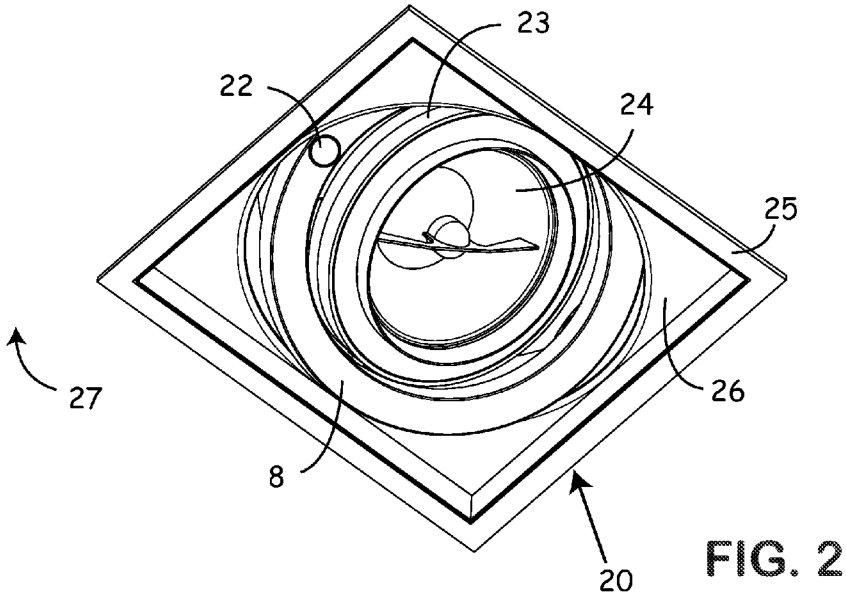
FIG. 2 is a front perspective view of a recessed light fixture with motorized central stage installed in a ceiling according to this invention.

Referring to FIG. 2, in a preferred embodiment, a recessed lamp with motorized gimbal will have a removable base or frame 26 that attaches to ceiling bracket 25 which is permanently mounted to ceiling 27. The motorized central stage 8 is attached to base 26 via two bearings (not shown) which can rotate. A lamp assembly 23 is attached to ring-shaped motorized central stage 8 via two bearings (not shown) and can rotate. A lamp 24 (such as an LED lamp) is removably attached to lamp assembly 23. Window 22 allows for visual or radio communications to pass through the housing of motorized central stage 8, and is positioned above the axis of rotation so its movement is minimized.

Figure 3:
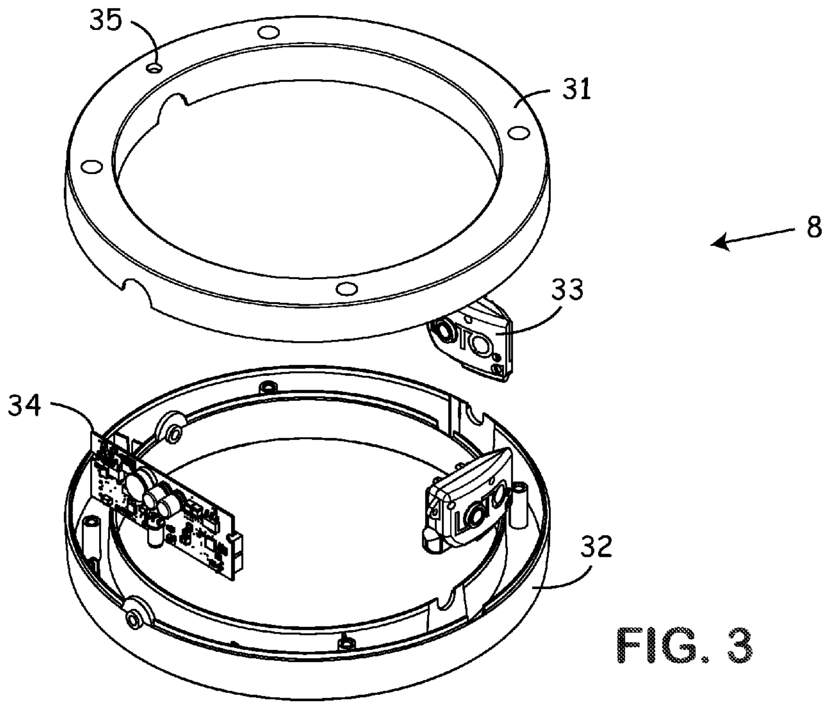
FIG. 3 is an exploded view of the motorized central stage according to this invention.

Referring to FIG. 3, in and exploded view of the preferred embodiment, motorized central stage 8 is shown with wiring removed for clarity. Two drive mechanisms 33 (including motor, gears and output shaft) and a communication and control board 34 are mounted between bottom half 32 and top half 31 of motorized central stage. An opening 35 allows for power wires to pass to the inside of the housing.

Figure 4:
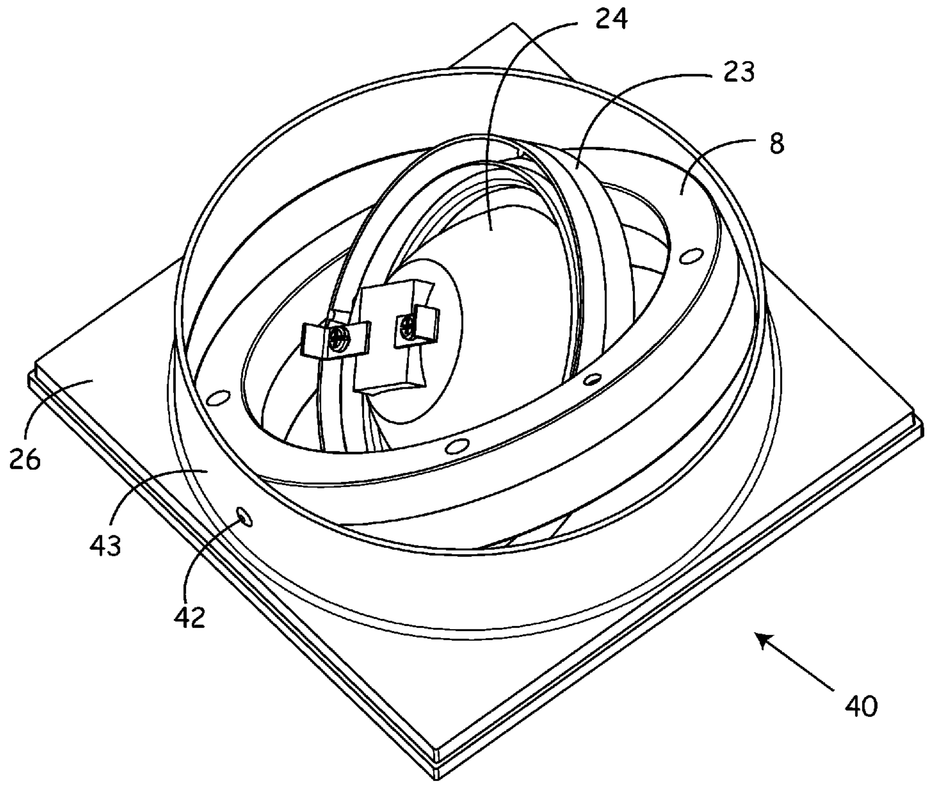
FIG. 4 is the top view of the motorized recessed fixture according to this invention after removal from a ceiling bracket.

Referring to FIG. 4, a top view of the assembled fixture 40 of the preferred embodiment is shown removed from the ceiling. Wires and mounting features of the removable base 26 to ceiling bracket are not shown for clarity. As is typical with recessed fixture deigns, a raised flange 43 is used to block the view of above. Motorized central stage 8 is mounted to this flange with a fastener 42, such as a rivet or screw. Lamp assembly 23 is attached to motorized central stage 8 via two bearings, and lamp 24 is removably attached to lamp assembly 23.

Figure 5:
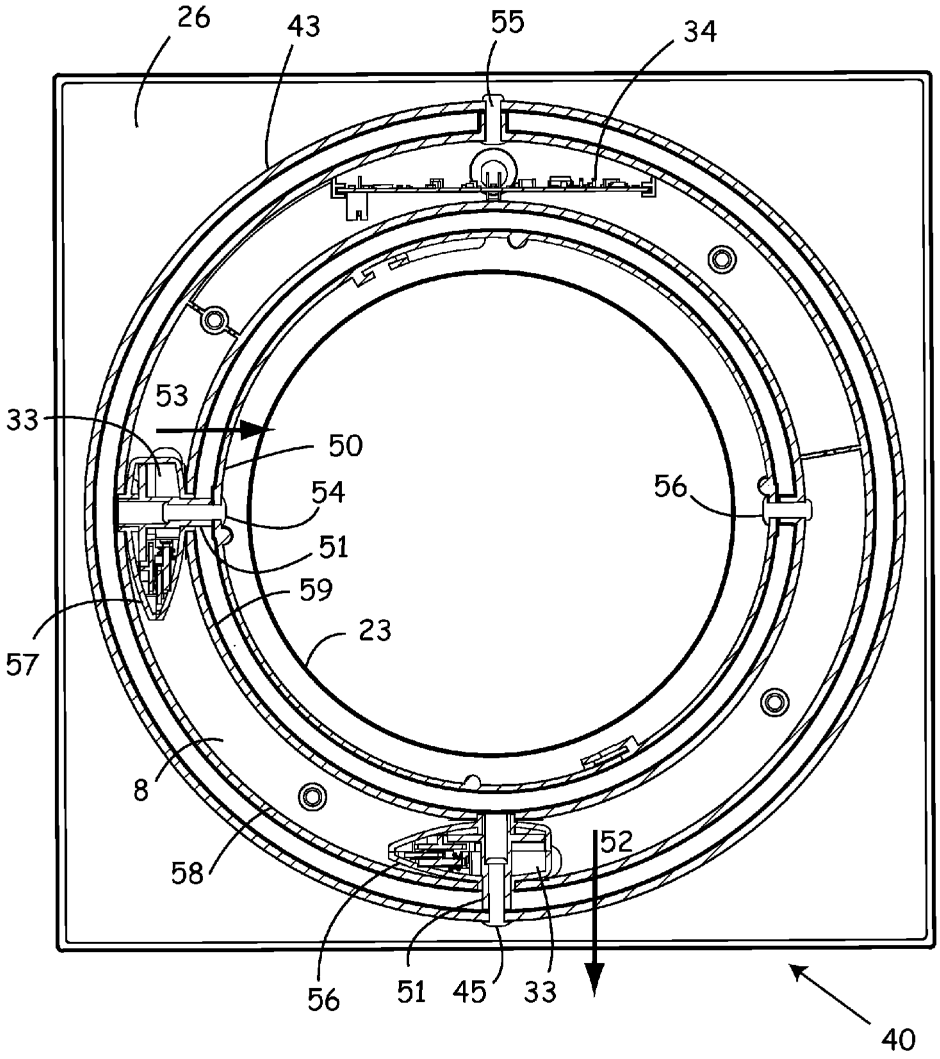
FIG. 5 is a sectional view through both axes of the motorized recessed fixture according to this invention.

Referring to FIG. 5 the motorized central stage 8 is mounted to base 26 on the inside wall of flange 43 in two locations. Fastener 45, such as a rivet or screw, is passed through output shaft 51 and through flange 43, and tightened to make a friction fit between shaft 51 and inside of flange 43. This is a standard method for mounting recessed fixtures, and provides a friction fit should manual adjustment be necessary. The opposite side is held by a bearing made by a pin or screw 55 that is in free rotation, or with nominal friction. Too much friction would burden the motor. Drive mechanism 33 is oriented such that output shaft 51 is facing outward from center of the fixture 52 such that convex shaped front wall 56 is up against the inside curved wall of housing 58.

The lamp assembly 23 is mounted to central stage 8 in two locations. Fastener 54, such as a rivet or screw, is passed through output shaft 51 and inside wall 50 of lamp ring 23, and tightened to make a friction fit. The opposite side is held by a bearing made by pin or screw 56 that is in free rotation or with nominal friction. Drive mechanism 33 is orientated such that the output shaft 51 is facing inward to the central 53 such that the convex shaped back wall 57 is up against the inside curved wall of housing 58.

Figure 6:
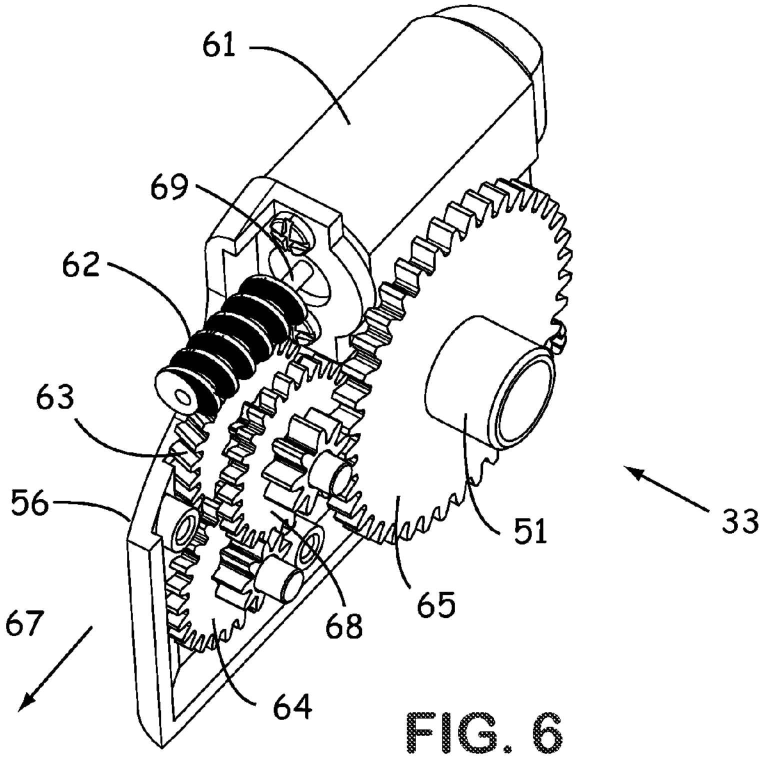
FIG. 6 is a front perspective view of the gear motor according to this invention, with half the housing removed to show gear arrangement.

Referring to FIG. 6, drive mechanism 33 consists of motor 61, worm 62 connected to motor output shaft 69, which turns gear 63. Gear 63 turns through gears 64 and 68 which drive output gear 65 and output shaft 51. The housing width decreases in the direction of arrow 67 away from the center shaft to accommodate a convex shape, so gears are arranged to fit in this decreasing width. Gear 64 is centered on the split line of the housing. This allows the housing of drive mechanism 33 to form a wedged shape by having convex shaped front wall 56 and convex shaped back wall 57 intersect at one end of the drive mechanism.

This allows drive mechanism 33 to fit well within the ring shaped central stage 8 with its convex walls mating with the concave inner wall of the interior region of the central stage 8. The design of the drive mechanism 33 also allows it to be used to drive both the lamp assembly 9 and the central stage 8 simply by placing the drive mechanism with its output shaft facing in the required direction, either towards the lamp assembly 9 or toward flange 43.

Figure 10:
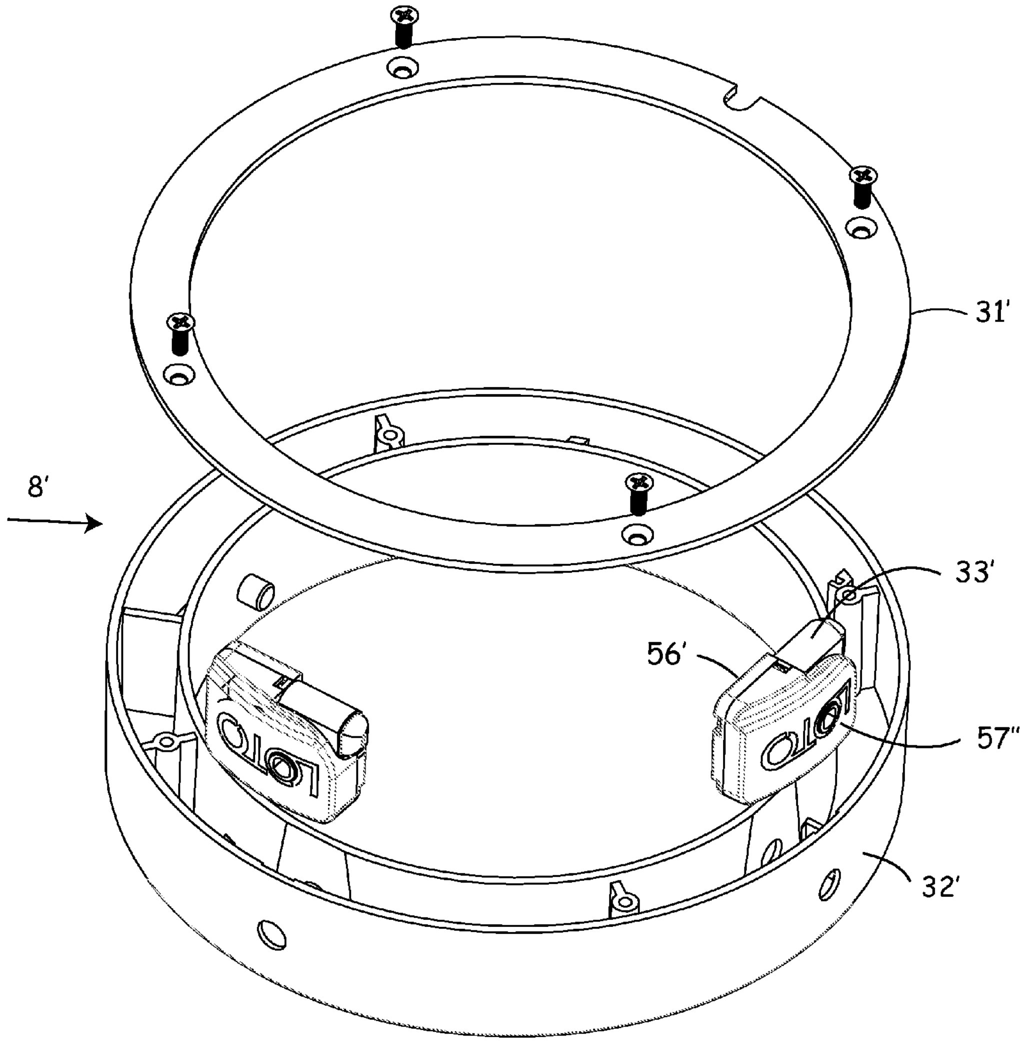
FIG. 10 is an exploded view of an alternative embodiment of the motorized central stage according to this invention.

In an alternative embodiment, drive mechanism 33', FIG. 10, may have only one convex shaped wall 57', with the opposite wall 56' being substantially flat. The housing of central stage 8', FIG. 10, may also have a different configuration from that shown in the prior figures. In FIG. 3, for example, central stage 8 has two housing portions 31 and 32 which are equally sized, each constituting about one half of the walls of the housing and having top and bottom cover portions, respectively. Central stage 8' instead includes a single housing portion 32' comprising the walls of the housing and there is a cover portion 31'. Although not shown in this figure, a bottom cover portion would also be included.

Figure 7:
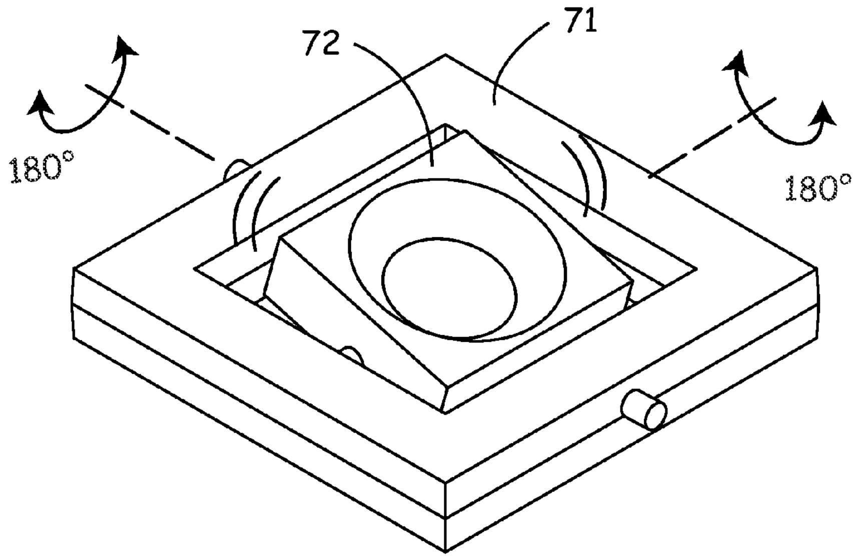
FIG. 7 is a front perspective view of a rectangular shaped motorized central stage according to this invention.

Referring to FIG. 7, there is shown a motorized rectangular-shaped (more specifically square-shaped) central stage 71 and rectangular-shaped (more specifically square-shaped) lamp housing 72. Motorized central stage 71 can rotate relative to an external mounting.

Figure 8:
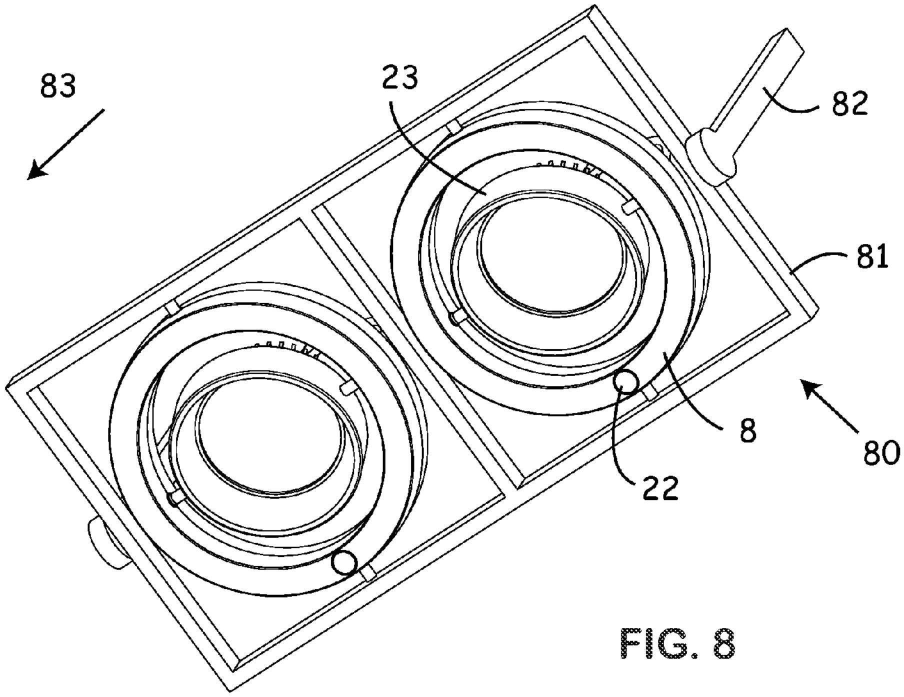
FIG. 8 is a perspective view of an exposed multiple lamp fixture according to this invention that is configured to be hung from the ceiling.

Referring to FIG. 8, a multiple lamp fixture 80 can contain more than one central stage 8 and lamp assembly 23 mounted to bracket 81, which is itself mounted on surface 83, such as a ceiling via brackets 82

Figure 9:
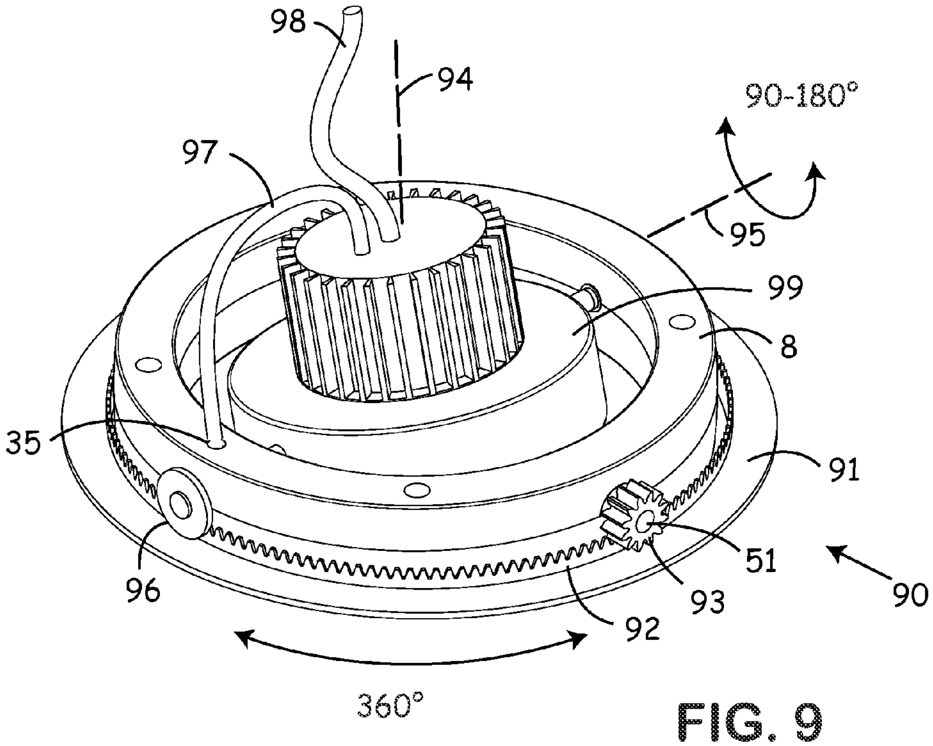
FIG. 9 is a front perspective view of a pan and tilt central stage using pinion and circular gear to rotate according to this invention.

In FIG. 9, a pan and tilt fixture assembly 90 consists of a motorized centralstage 8 riding on multiple wheels 96 on a base 91. There is an output pinion 93 mounted to motorized output shaft 51. Pinion 93 drives over circular gear 92, causing rotation of central stage 8 about vertical axis 94. Lamp assembly 99 is tilted relative to the central stage 8 about a horizontal axis 95. Power to the lamp 99 comes via cable 98. Central stage 8 can share power going to lamp 99 via cable 97 through opening 35, which is positioned over the axis of rotation to minimize movement of the cable.

It is to be understood that the foregoing description is intended to illustrate and not to limit the scope of the invention, which is defined by the scope of the appended claims. Other embodiments are within the scope of the following claims.

What is claimed is:

1. A motorized assembly for mounting on a frame of a light fixture, comprising:

a central housing having a first exterior surface and a second exterior surface, the second exterior surface defining an aperture in said central housing; the central housing including a first mounting mechanism configured to engage with and mount on the frame to enable rotation of the central housing about a first axis of rotation; the central housing further including an interior region between the first and second exterior surfaces;

wherein the central housing further includes:

a first wall including the first exterior surface and a first interior surface; and a second wall including the second exterior surface and a second interior surface;

wherein the first wall includes a first inside curved wall and the second wall includes a second inside curved wall spaced from the first inside curved wall, the first inside curved wall and the second inside curved wall defining the interior region;

a first drive mechanism, disposed within the interior region of the central housing and proximate the first exterior surface, engaged with the first mounting device to enable rotation of the central housing about the first axis of rotation when the central housing is engaged with the frame;

a second drive mechanism, disposed within the interior region of the central housing and proximate the second exterior surface, adapted for engagement with a second mounting mechanism; and wherein the first drive mechanism and the second drive mechanism are both disposed between the first inside curved wall and the second inside curved wall.

2. The motorized assembly of claim 1 further comprising a lamp assembly including the second mounting mechanism which engages with the second drive mechanism to mount the lamp assembly within the aperture of the central housing and enable rotation of the lamp assembly about a second axis of rotation, which is transverse to the first axis of rotation.

3. The motorized assembly of claim 2 wherein the central housing is in the shape of a ring and is configured to be disposed within a circular opening in the frame.

4. The motorized assembly of claim 2 wherein the first mounting mechanism comprises two bearing surfaces on opposite sides of the second exterior surface of the central housing and the second mounting mechanism comprises two bearing surfaces on opposite sides of the lamp assembly, which respectively engage with the frame and the first exterior surface of the central housing.

5. The motorized assembly of claim 4 wherein the first and second mounting mechanism are gimbals.

6. The motorized assembly of claim 5 wherein the first axis of rotation and the second axis of rotation are co-planar and perpendicular.

7. The motorized assembly of claim 2 wherein the first and second drive mechanisms each include an electric motor affixed to a gear assembly which drives an output drive shaft.

8. The motorized assembly of claim 7 wherein each of the first and second drive mechanisms include a drive housing with a first convex shaped exterior wall through which the output drive shaft extends.

9. The motorized assembly of claim 8 wherein each of the first and second drive mechanisms further include and a second convex shaped exterior wall opposite the first convex shaped exterior wall and wherein the first and second convex exterior walls converge at an end of a drive housing.

10. The motorized assembly of claim 7 wherein the interior region of the housing is enclosed.

11. The motorized assembly of claim 10 further including communication and control electronics within the interior region of the housing which enables the first and second drive mechanisms to be remotely controlled.

12. The motorized assembly of claim 4 wherein the two bearing surfaces of the first mounting device each include a pinion which engages with a gear on the frame and the second mounting device is a gimbal.

13. The motorized assembly of claim 11 wherein the central housing is in the shape of a ring and is configured to be disposed within a circular opening in the frame; wherein the gear on the frame is circular and surrounds the central housing; and wherein the pinions are driven by the first drive mechanism to cause the central housing to rotate about the first axis.

14. The motorized assembly of claim 13 wherein the first axis of rotation is perpendicular to the circular opening in the frame and the second axis of rotation is perpendicular to the first axis of rotation.

15. The motorized assembly of claim 2 wherein the lamp assembly includes an LED lamp.

16. A motorized light fixture for mounting on a surface, comprising:

a frame configured to be mounted on the surface; and a motorized assembly mounted on the frame, including:

a central housing, having a first exterior surface and a second exterior surface, the second exterior surface defining an aperture in said central housing; the central housing including a first mounting mechanism configured to engage with and mount on the frame to enable rotation of the central housing about a first axis of rotation; the central housing further including an interior region between the first and second exterior surfaces; wherein the central housing further includes:

a first wall including the first exterior surface and a first interior surface, and a second wall including the second exterior surface and a second interior surface;

wherein the first wall includes a first inside curved wall and the second wall includes a second inside curved wall spaced from the first inside curved wall, the first inside curved wall and the second inside curved wall defining the interior region;

a lamp assembly including a second mounting mechanism which engages with the second exterior surface of the central housing to mount the lamp assembly within the aperture of the central housing and enable rotation of the lamp assembly about a second axis of rotation, which is transverse to the first axis of rotation;

a first drive mechanism disposed within the interior region of the central housing and engaged with the first mounting mechanism to enable rotation of the central housing about the first axis of rotation;

a second drive mechanism disposed within the interior region of the central housing and engaged with the second mounting device to enable rotation of the lamp assembly about the second axis of rotation; and wherein the first drive mechanism and the second drive mechanism are both disposed between the first inside curved wall and the second inside curved wall.

17. The motorized light fixture of claim 16 further including a plurality of motorized assemblies mounted on the frame.

* * * * *